United States Patent
Oblizajek (10) Patent No.: US 8,359,921 B2
(45) Date of Patent: Jan. 29, 2013

(54) DYNAMIC BALANCING OF VEHICLE WHEEL ASSEMBLIES

(75) Inventor: Kenneth L. Oblizajek, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 259 days.

(21) Appl. No.: 12/880,298

(22) Filed: Sep. 13, 2010

(65) Prior Publication Data

US 2012/0060602 A1    Mar. 15, 2012

(51) Int. Cl.
    G01M 1/16    (2006.01)
(52) U.S. Cl. .......................................... 73/460; 301/5.21
(58) Field of Classification Search .................. 73/460, 73/458, 459, 468, 469; 301/5.21; 700/279
    See application file for complete search history.

(56) References Cited

U.S. PATENT DOCUMENTS

| | | | | |
|---|---|---|---|---|
| 4,143,970 | A * | 3/1979 | Lill | 356/155 |
| 4,357,832 | A * | 11/1982 | Blackburn et al. | 73/462 |
| 4,480,471 | A * | 11/1984 | Kogler et al. | 73/462 |
| 4,891,981 | A * | 1/1990 | Schonfeld | 73/460 |
| 5,206,984 | A | 5/1993 | Matumoto et al. | |
| 5,303,463 | A * | 4/1994 | Pollard | 29/705 |
| 5,355,729 | A * | 10/1994 | Douglas | 73/468 |
| 5,383,361 | A | 1/1995 | Matumoto | |
| 5,591,909 | A * | 1/1997 | Rothamel et al. | 73/462 |
| 6,244,108 | B1 | 6/2001 | McInnes et al. | 73/462 |
| 6,484,574 | B1 * | 11/2002 | Douglas et al. | 73/462 |
| 6,736,007 | B2 * | 5/2004 | Watanabe et al. | 73/459 |
| 6,879,882 | B2 * | 4/2005 | Montanari et al. | 700/279 |
| 6,983,656 | B2 * | 1/2006 | Cullum et al. | 73/487 |
| 7,065,444 | B2 * | 6/2006 | Braghiroli | 701/124 |
| 7,191,651 | B2 * | 3/2007 | Douglas et al. | 73/462 |
| 7,199,873 | B2 * | 4/2007 | Braghiroli | 356/139.09 |
| 7,221,441 | B2 * | 5/2007 | Douglas et al. | 356/139.09 |
| 7,320,248 | B2 * | 1/2008 | Douglas | 73/459 |
| 7,328,614 | B2 * | 2/2008 | Gerdes et al. | 73/461 |
| 7,574,913 | B2 * | 8/2009 | Gerdes et al. | 73/468 |
| 7,584,659 | B1 * | 9/2009 | Rogers et al. | 73/462 |
| 7,594,436 | B2 * | 9/2009 | Gerdes et al. | 73/459 |
| 7,610,808 | B2 * | 11/2009 | Corghi | 73/460 |
| 7,617,726 | B2 * | 11/2009 | Douglas | 73/462 |
| 7,658,108 | B2 * | 2/2010 | Douglas | 73/459 |
| 7,686,403 | B2 * | 3/2010 | Douglas | 301/5.21 |
| 8,061,200 | B2 * | 11/2011 | Douglas | 73/459 |
| 2002/0163245 | A1 * | 11/2002 | Watanabe et al. | 301/5.21 |
| 2005/0210976 | A1 * | 9/2005 | Gerdes et al. | 73/459 |
| 2007/0175275 | A1 * | 8/2007 | Carpenter et al. | 73/460 |
| 2008/0083277 | A1 * | 4/2008 | Douglas | 73/459 |
| 2010/0095767 | A1 * | 4/2010 | Douglas | 73/459 |

(Continued)

OTHER PUBLICATIONS

"Advanced Calculus" by Wilfred Kaplan, Addison-Wesley Publishing Co., Reading, MA, 1952, 7th printing, Jul. 1959, pp. 120-129.

(Continued)

*Primary Examiner* — Peter Macchiarolo
*Assistant Examiner* — Samir M Shah (57) ABSTRACT

A method to balance a wheel assembly. In a first aspect, corrective balance weights and position thereof are determined by a balancer and a closest corrective balance weight thereto is chosen, as well as one of higher and one of lower weight increment for each plane; chosen weights are paired to provide minimized residual and then attached to the planes of the wheel assembly. In a second aspect, imbalance weights are determined by a balancer; a pair of corrective balance weights, one at least ½ the determined imbalance weight are chosen, each separated by determined position angles to minimize residual and then respectively attached to the corrective balance plane(s) of the wheel assembly.

20 Claims, 8 Drawing Sheets

U.S. PATENT DOCUMENTS

2011/0056277 A1 * 3/2011 Douglas ............................ 73/66

OTHER PUBLICATIONS

"Monte Carlo" simulation, described in "Quality by Experimental Design", Thomas B. Barker, Utilization of Empirical Equations, Monte Carlo Simulations, pp. 331-343, Marcel Dekker, Inc, 1985, ISBN 0-8247-7451-5.

"Mathematical Handbook for Scientists and Engineers", Second Edition, Representation of Complex Numbers as Points or Position Vectors, 1.3-2 and Representation of Addition, Multiplication, and Division, Powers and Roots, 1.3-3, Granino A. Korn, Theresa M. Korn, McGraw-Hill Book Company, 1968, Library of Congress Catalog Card No. 67-16304.

Prior art method for wheel assembly balancing, on the market since at least as early as Jan. 2009, 7 pages.

* cited by examiner

DYNAMIC BALANCING OF VEHICLE WHEEL ASSEMBLIES

TECHNICAL FIELD

The present invention relates to vehicle wheel assemblies and more particularly to dynamic balancing of wheel assemblies.

BACKGROUND OF THE INVENTION

Wheel balance, also frequently referred to as wheel imbalance, wheel unbalance, tire balance, tire imbalance or tire unbalance, relates to the distribution of mass within a vehicle tire and the wheel to which it is attached. Herein, the vehicle tire and the wheel to which it is attached, including the stem and stem pressure sensor, if so equipped, are referred to as the "wheel assembly". When the wheel assembly rotates, a non-uniform distribution of mass about the spin axis can cause the wheel assembly to produce periodic forces and moments at the frequency of the rotation rate of the wheel. These forces and moments can give rise to ride disturbances, usually vertical and fore-aft vibrations and can be considered objectionable by the occupants of the vehicle. Furthermore, the forces and moments produced by these non-uniformities in mass distribution originate in inertial mechanisms, resulting in a monotonic increase in amplitudes with speed. In addition, vehicle suspensions can be disproportionately excited by the unbalanced forces when the speed of the wheel assembly reaches a point that its rotating frequency coincides with a suspension's resonant frequency producing elevated disturbances detectable by occupants. The potential occurrence of these perceptible disturbances arising from imbalance excitation in isolation or in combination with other internally generated force and moment excitation at the spindles of the vehicle, created by common operation of the vehicle at usage speeds, demands attention. Tires are therefore inspected for balance in tire factories; wheel assemblies are inspected at vehicle assembly plants and repair shops by one of two methods: static balancing and dynamic balancing. Tires with excessive imbalance are reworked, downgraded or rejected. When tires are fitted to wheels to produce a wheel assembly at vehicle assembly plants, subassembly operations prior to delivery to vehicle assembly plants, or the point of sale at retail shops, the wheel assembly is measured for balance and correction weights are most typically applied to the wheel of the wheel assembly to counteract the imbalance.

Static balance can be measured by a static balancing machine where the wheel assembly is typically placed horizontally on a non-rotating spindle tool with freedom to angulate about a pivot on the intended, vertically oriented spin axis. The mass distribution is acted on by gravity, and the location on the wheel assembly where the integrated effect of the mass distribution is greatest causes the spindle tool to deflect downward at that point. The amount of deflection indicates the magnitude of the effective imbalance. The angle of the deflection indicates the angular location of the effective imbalance. In tire manufacturing factories, static balancers operate by use of sensors mounted to the spindle assembly. In tire retail shops, static balancers are usually non-rotating bubble balancers, where the magnitude and angle of the wheel assembly imbalance is indicated by the position of the center bubble in an oil-filled glass sighting gauge.

Dynamic balance describes the forces generated by particular uneven mass distributions when the wheel assembly is rotated, usually at a relatively high speed. Dynamic balance is more comprehensive than static balance alone, because both dynamic forces and moments of the wheel assembly are measured and attempted to be corrected. These dynamic machines typically sense multiple reaction forces of a stiff spindle as the tire rotates at sufficient speed to enable sensing of the inertially created forces. In the tire manufacturing factory, the tire is mounted on a balancing machine test wheel, the assembly is accelerated to a speed of 300 RPM or higher, and sensors measure the multiple forces of imbalance as the tire rotates. These forces are ultimately resolved into equivalent static and couple (i.e., moment or torque) values, using techniques well know in the art. These forces and moments are further transformed into equivalent imbalance amounts at the inner and outer planes of the wheel, and compared to the imbalance tolerances (the maximum allowable manufacturing limits). The methodologies and processes have evolved over the years to address the determination of an effective centroid of mass within the envelope of the tire and wheel assembly whose location is not on the spin axis. These can be mathematically conceptualized as applications of the first integrals of mass for determination of the first order contributions of the mass distributions to periodic inertial force systems occurring at the spindles. Although other harmonics of mass distribution can become significant owing to the deformable tire, and thereby, produce perceptible disturbance levels, those associated with the first moments of mass account for a disproportionately large percentage of vibration complaints.

In tire retail shops, wheel assemblies are checked on a dynamic spin-balancer, which determines two corrective balance weights and respective corresponding angles for each corrective balance weight, with respect to an angle reference determined by the spin-balancer, at which each corrective balance weight is to be placed at a predetermined radius at each of two separate predetermined planes to attempt to minimize the couple and static forces and also minimize the couple and static balance residuals so as to correct for static and dynamic wheel assembly imbalance within a predetermined limit for couple residual of the wheel assembly as determined by the spin-balancer.

In manufacturing and assembly plants, the two separate planes and the radius for affixing the corrective balance weights of each of the two separate planes are predetermined by the design of the wheel assembly. For example, a first predetermined plane may be that which is perpendicular to the axis of rotation of the wheel assembly at the outer flange of the wheel and the predetermined radius in the first plane may be that from the axis of rotation of the wheel assembly to the rim of the outer flange of the wheel; whereas a second predetermined plane may be that which is perpendicular to the axis of rotation of the wheel assembly and at the inner flange of the wheel, and the predetermined radius in the second plane may be that from the axis of rotation of the wheel assembly to the rim of the inner flange of the wheel.

However, corrective balance weights usually have discrete values defined by a predetermined minimum incremental weight, for example the predetermined minimum incremental weight may be ¼ oz, resulting in available adjacent discrete corrective balance weights varying by ¼ oz increments. As such, the two required, precise balance weights (one balance weight for each plane) determined by the spin-balancer may not be available. In one current practice, the two precise balance weights determined by the spin-balancer are each rounded to the nearest available corrective balance weight to produce two "best" selected corrective balance weights. This method is herein referred to as the "rounding" method. The two selected available corrective balance weights, if different from the two precise balance weights determined by the spin-balancer, as is usually the case, cannot simultaneously satisfy static and, or couple balance of the wheel assembly if placed at the respective corresponding angles for the two precise balance weights determined by the spin-balancer.

Further elaborating the common prior art practice, the rounding method involves recalculating the angles for each selected corrective balance weight to be placed at each predetermined radius of each of the two separate predetermined planes in order to attempt to best correct static imbalance forces of the wheel assembly as determined by the spin-balancer by minimizing the residual for static balance within a predetermined limit for couple residual. The techniques for determining and calculating couple and static forces and couple and static residuals to correct static imbalance forces of the wheel assembly within a predetermined limit for couple residual of the rounding method are well know to the practitioners of the art. In many cases, however, this common practice is unsatisfactory, leaving high static and, or couple residuals.

Figure 1:
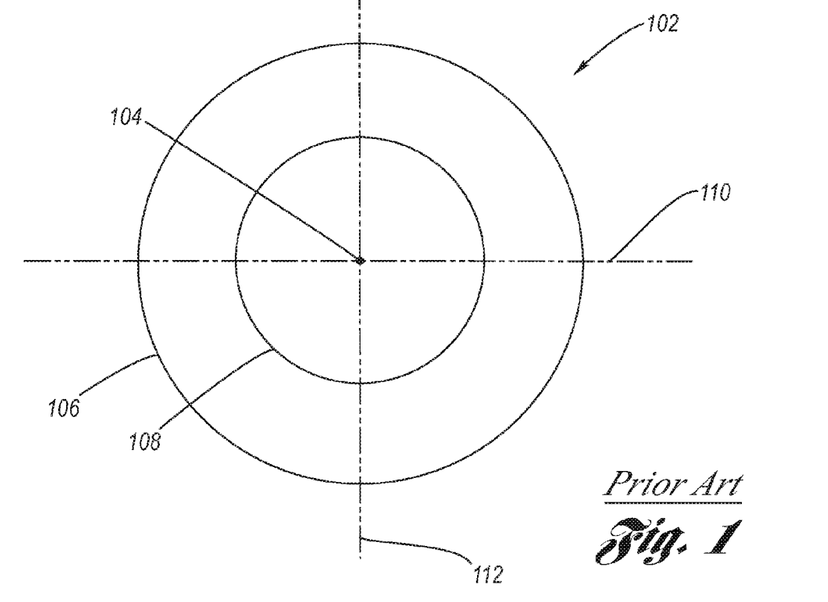
FIG. 1 depicts a wheel assembly viewed along the axis of rotation thereof.

FIG. 1 depicts a wheel assembly 102 having an axis of rotation 104 (i.e., the vehicle wheel axle), tire 106, wheel 108, a second axis 110, and a third axis 112. As a first example of the prior art method of wheel balancing and using the rounding method, the wheel assembly 102 has a total equivalent static imbalance of 2.24 oz as determined by a spin-balancer, represented in FIG. 2, viewed along the third axis 112, of a first precise imbalance weight 114 of 1.12 oz occurring at a first predetermined radius 116 in a first predetermined plane 118 and a second precise imbalance weight 120 of 1.12 oz occurring at a second predetermined radius 122 in a second predetermined plane 124, axially displaced along the direction of the spin axis from that of the first predetermined plane. With the constrained placement of correction weights within the two predetermined planes 118 and 124, the wheel assembly 102 requires two equal corrective balance weights of 1.12 oz placed at points 126 and 128 with radii 130 and 132, respectively, as determined by a spin-balancer in order to balance the wheel assembly wherein radii 116, 122, 130, and 132 are equal. FIG. 3, viewed along the second axis 110, depicts the location of the two 1.12 oz precise imbalance weights 114 and 120 as well as points 126 and 128.

Figure 4:
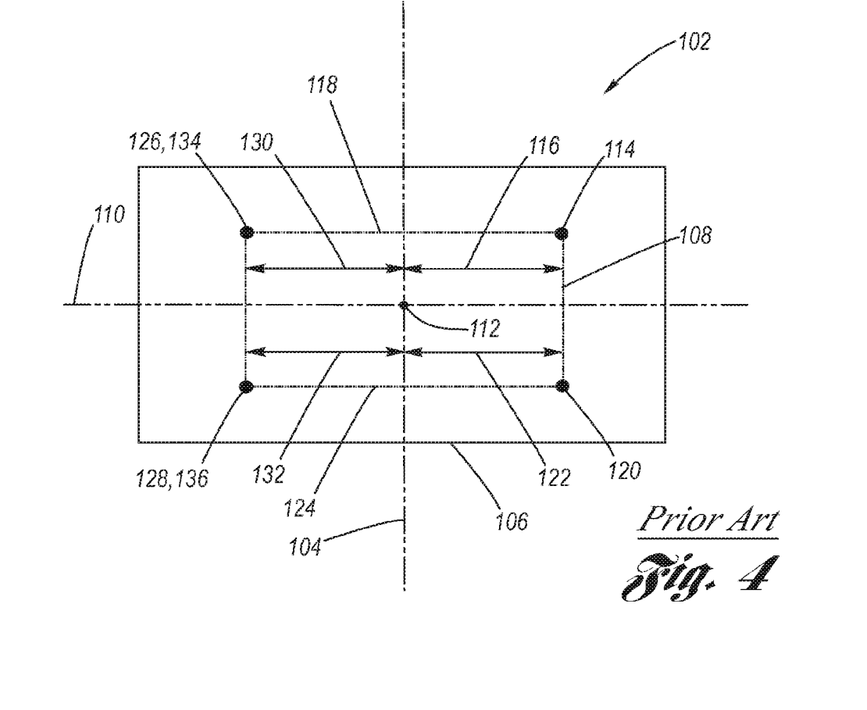
FIG. 4 depicts the first prior art example viewed along a third axis with 1 oz selected balance weights.

Assuming availability of corrective balance weights only in increments of ¼ oz, the closest corrective balance weight obtainable to 1.12 oz is a 1 oz selected corrective balance weight. FIG. 4, viewed along the third axis 112, depicts the two 1 oz selected corrective balance weights 134 and 136 placed at points 126 and 128, respectively. In conjunction with the two 1.12 oz precise imbalance weights 114 and 120, the two 1 oz selected corrective balance weights 134 and 136 placed at points 126 and 128 do not produce any couple residual imbalance but do produce a static residual imbalance of 0.24 oz of the wheel assembly 102, due to the use of available discrete selected corrective balance weights, discrete balance weight increments and the rounding method. The techniques used for determining the couple and static residual imbalance of the wheel assembly 102 within a predetermined limit for couple residual are well know to the practitioners of the art.

Figure 5:
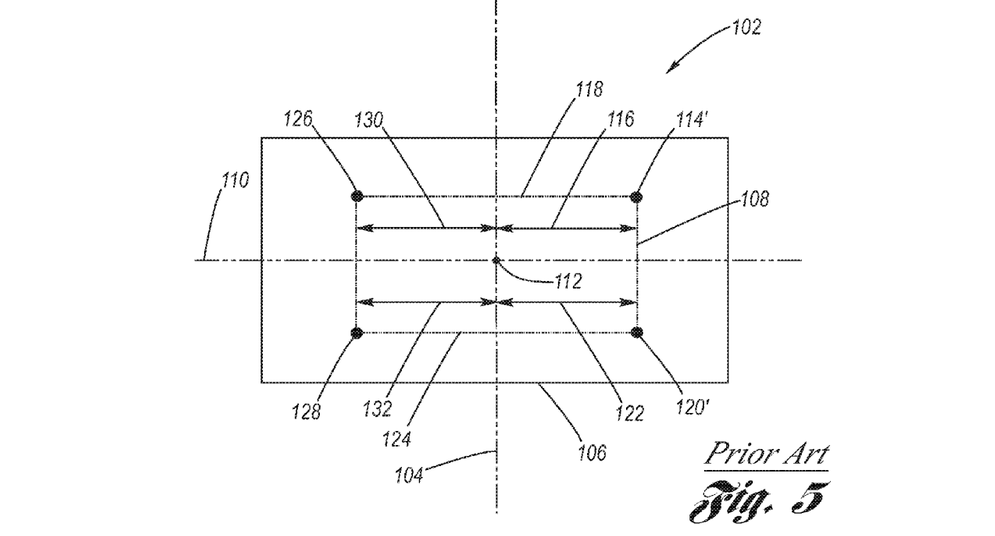
FIG. 5 depicts a second prior art example of wheel assembly balancing viewed along a third axis.
Figure 6:
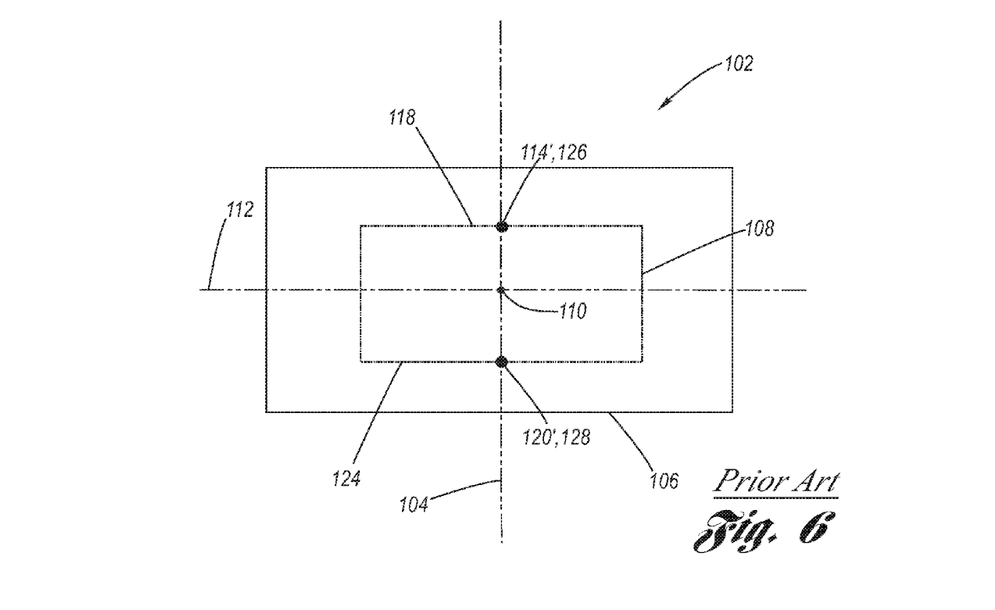
FIG. 6 depicts the second prior art example of wheel assembly balancing viewed along a second axis.

As a second example of the prior art method of wheel balancing, the wheel assembly 102 has a total static precise imbalance of 3.75+ oz as determined by a spin-balancer, equivalently represented in FIG. 5, viewed along the third axis 112, of a first precise imbalance weight 114' of 1.875+ oz occurring at a first predetermined radius 116 of a first predetermined plane 118 and a second precise imbalance weight 120' of 1.875+ oz occurring at a second predetermined radius 122 of a second predetermined plane 124. (The '+' suffix following the numbers signifies an extremely small, non-zero increment over the value of the number.) With the constrained placement of corrective weights within the two predetermined planes 118 and 124, the wheel assembly 102 requires two equal corrective balance weights of 1.875+ oz placed at points 126 and 128 with radii 130 and 132, respectively, as determined by a spin-balancer, to balance the wheel assembly, wherein radii 116, 122, 130, and 132 are equal. FIG. 6 viewed along the second axis 110 depicts the location of the two 1.875+ oz precise imbalance weights 114' and 120' as well as points 126 and 128.

Figure 7:
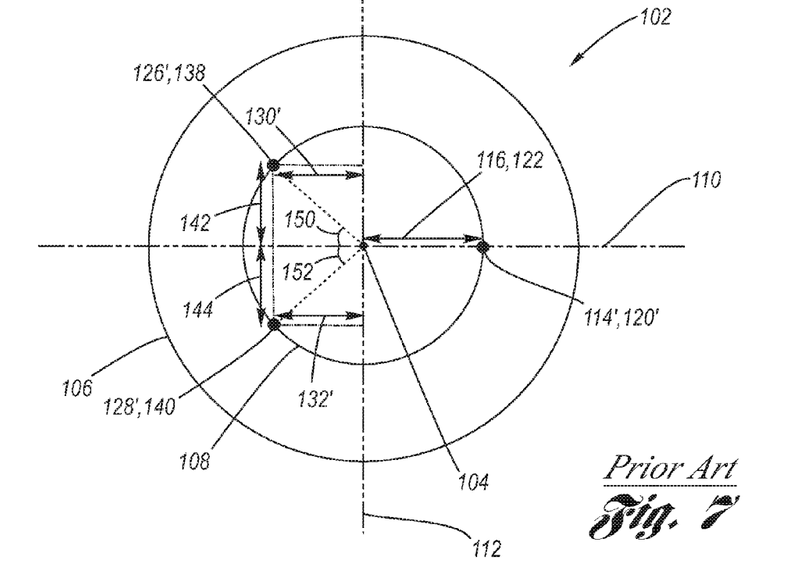
FIG. 7 depicts the second prior art example of wheel assembly balancing viewed along the axis of rotation of the wheel assembly.

Assuming the availability of corrective balance weights only in increments of ¼ oz and a predetermined limit for couple residual of 0.25 oz, the following situation arises in attempting to balance the assembly. The closest corrective balance weight obtainable to 1.875+ oz is a 2 oz selected corrective balance weight. As determined by a spin-balancer and applying the rounding method, the wheel assembly 102 requires two equal selected corrective balance weights of 2 oz placed at points 126' and 128' with projections of radii 130' and 132' respectively, at an angle α=7.2 degrees, 150, on the first predetermined plane 118 and α'=7.2 degrees, 152, on the second predetermined plane 124, as depicted in FIGS. 7 and 8, to balance the wheel assembly, wherein projections of radii 130' and 132' are equal and radii 116 and 122 are equal.

Figure 8:
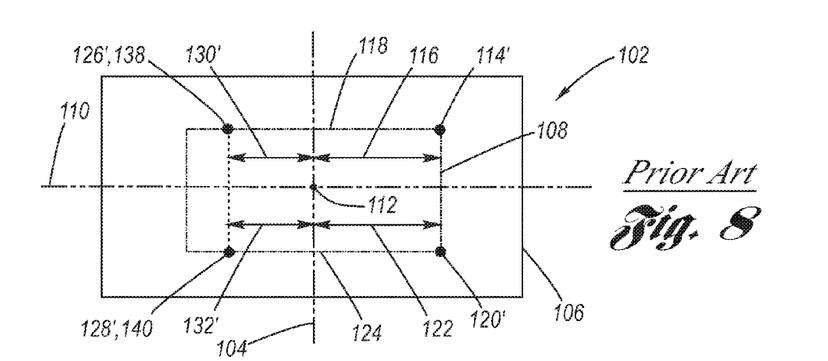
FIG. 8 depicts the second prior art example of wheel assembly balancing viewed along a third axis with 2 oz selected balance weights.

FIG. 8, viewed along the third axis 112, depicts the two 2 oz selected corrective balance weights 138 and 140 placed at points 126' and 128', respectively. In conjunction with the two 1.875+ oz precise imbalance weights 114' and 120', the two 2 oz selected corrective balance weights 138 and 140 placed at points 126' and 128' produce a couple residual imbalance of 0.25 oz and a static residual imbalance of 0.22 oz of the wheel assembly 102 due to the use of discrete selected corrective balance weights, discrete balance weight increments and the rounding method, determined by techniques well know to practitioners of the art.

Figure 9:
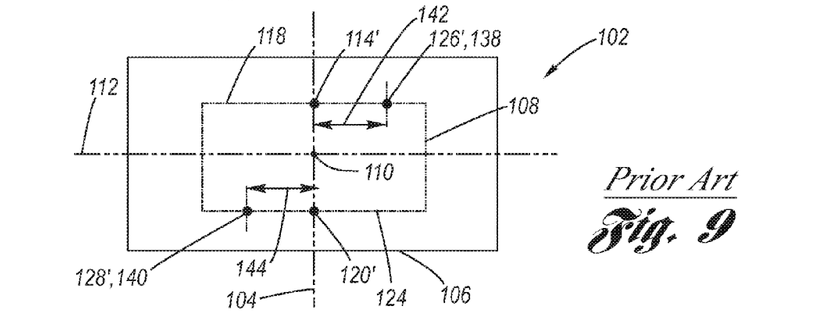
FIG. 9 depicts the second prior art example of wheel assembly balancing viewed along a second axis with 2 oz selected balance weights.

FIG. 9, viewed along the second axis 110, depicts the hypothetical location of the two 1.875+ oz 114' and 120' precise imbalance weights and the actual placement of the two 2 oz selected corrective balance weights 138 and 140 placed at points 126' and 128' having projections of radii 142 and 144, respectively, wherein projections of radii 142 and 144 are equal.

It will be shown in subsequent sections by contrasting the specific examples set forth in the preceding that the prior art rounding method is limited due to the resulting residuals in attempting to minimize the couple and static forces and couple and static balance residuals to correct for static and dynamic wheel assembly imbalance within a predetermined limit for couple residual.

Accordingly, what is needed in the art is a method to minimize the couple and static forces and couple and static balance residuals to correct for static and dynamic wheel assembly imbalance within a predetermined limit for couple residual with respect to the prior art method using discrete balance weights and discrete balance weight increments.

SUMMARY OF THE INVENTION

The present invention is a method to minimize or eliminate the couple and static forces and couple and static balance residuals to correct for static and dynamic wheel assembly imbalance within a predetermined limit for couple residual (or error) resulting in performance improvement, observable in static and couple residuals, over the prior art method, constraining both methods to use discrete corrective balance weights available in identical discrete balance weight increments.

A first aspect of the present invention is a method of selecting a pair of corrective balance weights from a multiplicity of candidate corrective balance weights, whereby each weight of the selected pair of corrective balance weights is to be evaluated, as previously described, at a predetermined radius and respective corresponding angle, with respect to a predetermined angle reference, at each of two separate predetermined planes to thereby minimize the couple and static forces and couple and static balance residuals in order to correct for static and dynamic wheel assembly imbalance within a predetermined limit for couple residual of the wheel assembly.

The multiplicity of candidate corrective balance weights is based on the two precise imbalance weights determined by a dynamic spin-balancer and respective corresponding angles for each corrective balance weight, with respect to an angle reference determined by the spin-balancer, at which each corrective balance weight is to be evaluated, as previously described, at a predetermined radius at each of two separate predetermined planes to seek minimization of the couple and static forces and couple and static balance residuals so as to correct for static and dynamic wheel assembly imbalance within a predetermined limit for couple residual of the wheel assembly as determined by the spin-balancer and the predetermined minimal incremental weight.

First and second candidate corrective balance weights of the first multiplicity and the second multiplicity of candidate corrective balance weights, respectively, are the nearest available corrective balance weights to the first and second corrective balance weights determined by the spin balancer using the rounding method to be evaluated in the first and second predetermined planes at the first and second predetermined radii. Subsequent weights of the first multiplicity of candidate corrective weights are chosen one increment larger than and one increment less than the first candidate corrective balance weight. Subsequent weights of the second multiplicity of candidate corrective weights are chosen one increment larger than and one increment less than the second corrective balance weight. If the first candidate corrective balance weight is zero, then the selection of a candidate balance weight less than the first candidate balance weight for that multiplicity of candidate balance weights is eliminated, resulting in only 2 candidate corrective balance weights for that multiplicity. If the second candidate corrective balance weight is zero, then the selection of a candidate balance weight less than the first candidate balance weight for that multiplicity of candidate balance weights is eliminated, resulting in only 2 candidate corrective balance weights for that multiplicity.

The first multiplicity of candidate corrective balance weights is, preferably, pair-wise combined with the second multiplicity of candidate corrective weights in all possible combinations of pairs by firstly, selecting one candidate corrective weight from the first multiplicity of candidate corrective weights and, then selecting a second candidate corrective weight from the second multiplicity of candidate corrective weights, to produce a multiplicity of pairs of candidate corrective balance weights. For each pair of candidate corrective balance weights from the multiplicity of pairs of candidate corrective balance weights, static residual is individually minimized within a predetermined limit for couple residual, and each candidate corrective balance weight of the pair of candidate corrective balance weights is to be evaluated, as previously described, at a predetermined radius and respective corresponding angle, with respect to a predetermined angle reference, at each of the two corresponding separate predetermined planes to thereby minimize the couple and static forces and couple and static balance residuals so as to correct for static and dynamic wheel assembly imbalance within a predetermined limit for couple residual of the wheel assembly. In this regard, the techniques for minimizing static residual within a predetermined limit for couple residual for a given pair of candidate corrective balance weights are known in the art. The selected pair of corrective balance weights from the multiplicity of pairs of candidate corrective balance weights is that pair of corrective balance weights which produces the minimal static residual within a predetermined limit for couple residual.

A second aspect of the present invention is a method of determining, at least, a pair of corrective balance weights for a predetermined plane whereby both corrective balance weights of the selected pair of corrective balance weights are evaluated, as previously described, at predetermined radii and respective corresponding angles, with respect to a predetermined line reference, at each of two separate predetermined planes to thereby minimize the couple and static forces and couple and static balance residuals so as to correct for static and dynamic wheel assembly imbalance.

Each, at least, pair of corrective balance weights for a predetermined plane is based on the precise imbalance weight, at a predetermined plane, determined by a dynamic spin-balancer and respective corresponding line reference determined by the spin-balancer, at which the corrective balance weight is to be evaluated, as previously described, at a predetermined radius on a predetermined plane to seek minimization of the static forces and static balance residuals so as to correct for static and dynamic wheel assembly imbalance as determined by the spin-balancer and the predetermined minimal incremental weight. First and second corrective balance weights of each, at least, pair of corrective balance weights for each predetermined plane are rounded to available corrective balance weights.

Each corrective balance weight of the pair of corrective balance weights for a given predetermined plane is evaluated at a predetermined position angle with respect to a line reference and predetermined radius. When practiced for two predetermined planes, two pairs of corrective weights for both predetermined planes mathematically eliminate static and couple residuals. Proper choice of each corrective balance weight of each pair of corrective balance weights for each predetermined plane can result in the second aspect of the present invention providing theoretically perfect balance, wherein static and couple residuals are zero. Any remaining residuals would be error residuals due to, by example, weight misplacement, either slight or large weight tolerances, dimensional variation of the wheel at the selected site of weight placement or machine measurement capability.

Accordingly, it is an object of the present invention to minimize couple and static balance residuals to correct for static and dynamic wheel assembly imbalance within a predetermined limit for couple residual improving the methods of the prior art rounding method using discrete balance weights and discrete balance weight increments.

This, and additional objects, advantages, features, and benefits of the present invention will become apparent from the following specification.

DESCRIPTION OF THE PREFERRED EMBODIMENT

Figure 10:
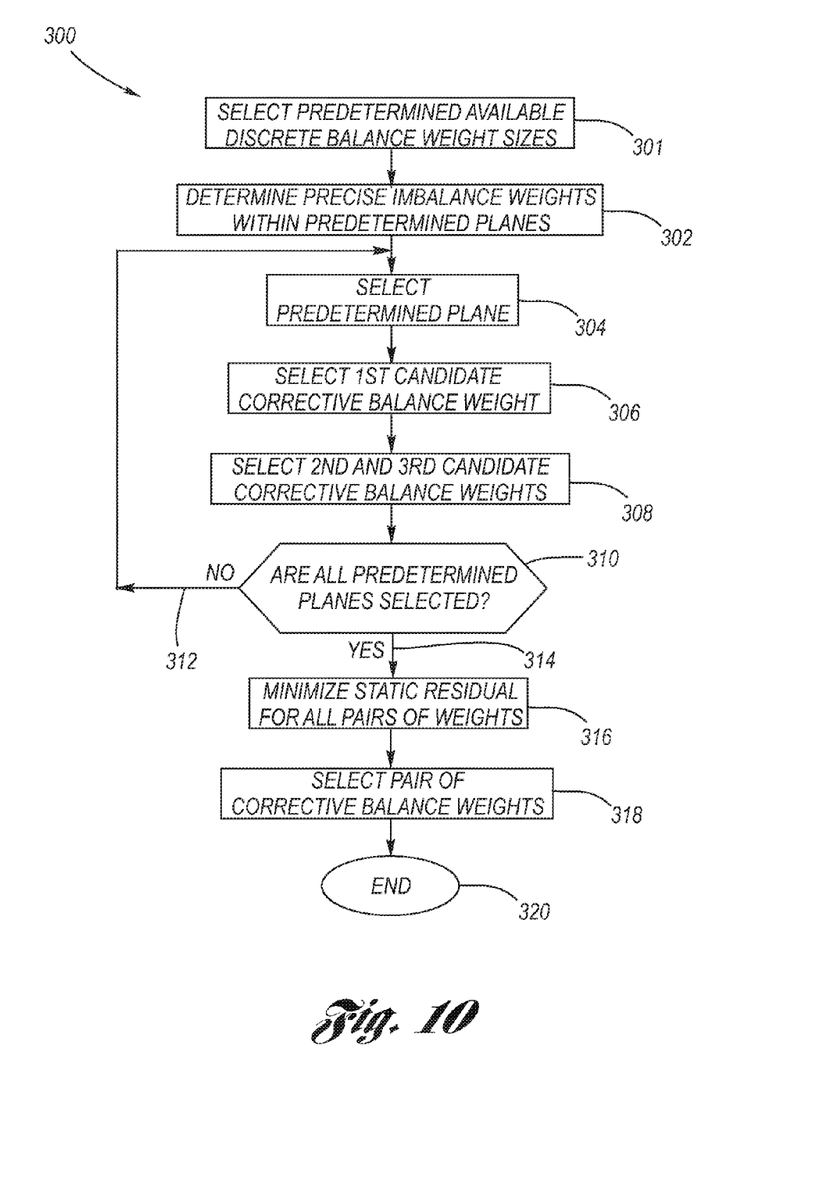
FIG. 10 depicts a flow chart illustrating a method of selecting a pair of balance weights according to the first aspect of the wheel assembly balancing method of the present invention.

FIG. 10 depicts a flow chart 300 illustrating a method of selecting a pair of corrective balance weights, utilizing, in this example, three selected candidate corrective balance weights per each predetermined plane, according to a first aspect of the present invention, wherein flow chart 300 is to be read in association with the following Chart Key 1.

CHART KEY 1

| Block/Line | Description |
| --- | --- |
| 301 | SELECT PREDETERMINED AVAILABLE DISCRETE BALANCE WEIGHT SIZES |
| 302 | DETERMINE PRECISE IMBALANCE WEIGHTS WITHIN PREDETERMINED PLANES |
| 304 | SELECT PREDETERMINED PLANE |
| 306 | SELECT $1^{ST}$ CANDIDATE CORRECTIVE BALANCE WEIGHT |
| 308 | SELECT $2^{ND}$ & $3^{RD}$ CANDIDATE CORRECTIVE BALANCE WEIGHTS |
| 310 | ARE ALL PREDETERMINED PLANES SELECTED? |
| 312 | NO |
| 314 | YES |
| 316 | MINIMIZE STATIC RESIDUAL FOR ALL PAIRS OF WEIGHTS |
| 318 | SELECT PAIR OF CORRECTIVE BALANCE WEIGHTS |
| 320 | END |

At Block 301, discrete sizes of corrective balance weights are determined for availability for eventual physical placement or affixing to the wheels. At Block 302, two precise imbalance weights are determined by a dynamic spin-balancer and respective corresponding angles for each corrective balance weight, with respect to an angle reference determined by the spin-balancer, as previously described, at a predetermined radius at each of two separate predetermined planes to attempt to minimize the couple and static forces and couple and static balance residuals so as to correct for static and dynamic wheel assembly imbalance within a predetermined limit for couple residual of the wheel assembly as determined by the spin-balancer. At Block 304, one of the two predetermined planes is selected, for example, a first predetermined plane. At Block 306, a first precise imbalance weight for the selected predetermined plane, as determined in Block 302, is rounded to a closest available first selected candidate corrective balance weight according to the predetermined available weight sizes. For example, a first precise imbalance weight of 1.12 oz for the selected predetermined plane determined by Block 302 would be rounded to an available first selected candidate corrective balance weight of 1 oz, given a predetermined minimal incremental weight of ¼ oz. At Block 308, second and third available candidate corrective balance weights for the selected predetermined plane are selected such that they differ from the first selected candidate corrective balance weight by ±one minimal incremental balance weight, respectively. For example, assuming a minimal incremental weight of ¼ oz, for a first selected candidate corrective balance weight of 1 oz, the second and third selected candidate corrective balance weights would be 1.25 oz and 0.75 oz, respectively. If one of the selected candidate corrective balance weights is zero, only one other candidate corrective balance weight would be selected such that it differs from the other selected candidate corrective balance weight by +one minimal incremental balance weight (i.e., there would not be a third selected candidate corrective balance weight in this case).

At Block 310, if both predetermined planes have not been selected, control passes to Block 304 via line 314. At Block 304, the other, or second, predetermined plane is selected. At Blocks 306 and 308 selection is made of an additional three candidate corrective balance weights (two additional selected candidate corrective balance weights if one of the selected candidate corrective balance weights is zero) for this plane, as previously described.

At Block 310, if both predetermined planes have been selected, control passes to Block 316 via line 314. At Block 316, assuming three selected candidate corrective balance weights per predetermined plane, a total of six selected candidate corrective balance weights for the two predetermined planes results in nine possible pair combinations of the selected candidate corrective balance weights for the two predetermined planes, wherein for each possible pair of selected candidate corrective balance weights of the nine possible pairs of candidate corrective balance weights, a first selected candidate corrective balance weight of the pair of balance candidate corrective weights corresponds to a first predetermined plane and the second selected candidate corrective balance weight of the pair of candidate corrective balance weights corresponds to the second predetermined plane.

An example is provided in Table 1, wherein the candidate corrective balance weights are 0.75 oz, 1.00 oz, and 1.25 oz for each predetermined plane resulting in nine possible pair combinations of candidate corrective balance weights, and wherein a first candidate corrective balance weight of the pair of candidate corrective balance weights corresponds to a first predetermined plane and the second candidate corrective balance weight of the pair of candidate corrective balance weights corresponds to a second predetermined plane.

TABLE 1

| Predetermined Planes | Plane 1 | Plane 2 |
| --- | --- | --- |
| First selected balance weight (oz) | 0.75 | 0.75 |
| Second selected balance weight (oz) | 1.00 | 1.00 |
| Third selected balance weight (oz) | 1.25 | 1.25 |
| Nine possible combinations of pairs (oz) | 0.75 | 0.75 |
|  | 0.75 | 1.00 |
|  | 0.75 | 1.25 |
|  | 1.00 | 0.75 |
|  | 1.00 | 1.00 |
|  | 1.00 | 1.25 |
|  | 1.25 | 0.75 |
|  | 1.25 | 1.00 |
|  | 1.25 | 1.25 |

Each pair of the nine possible combinations of pairs is subjected to mathematical minimization techniques with respect to static residual resulting in an angle, with respect to an angle reference, and predetermined radius for each predetermined plane such that each pair of candidate corrective weights minimizes static residual within a predetermined limit for couple residual, wherein the techniques for minimizing static residual within a predetermined limit for couple residual for a given pair of weights are known in the art. For example, a technique for minimization is described in "Advanced Calculus" by Wilfred Kaplan, Addison-Wesley Publishing Co., Reading, Mass., 1952, 7$^{th}$ printing, 7/1959, pages 120-129.

At Block 318, the pair of selected candidate corrective balance weights selected from the nine possible combinations of pairs of candidate corrective weights is that pair of selected corrective balance weights which produces the minimal static residual within a predetermined limit for couple residual. The balance weight selection method ends at Block 320.

Figure 2:
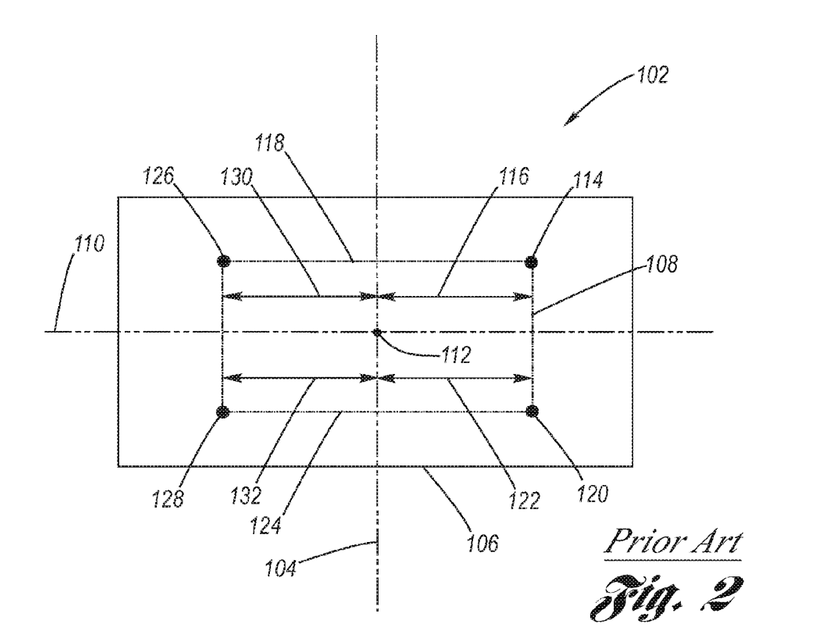
FIG. 2 depicts a first prior art example of wheel assembly balancing viewed along a third axis.
Figure 3:
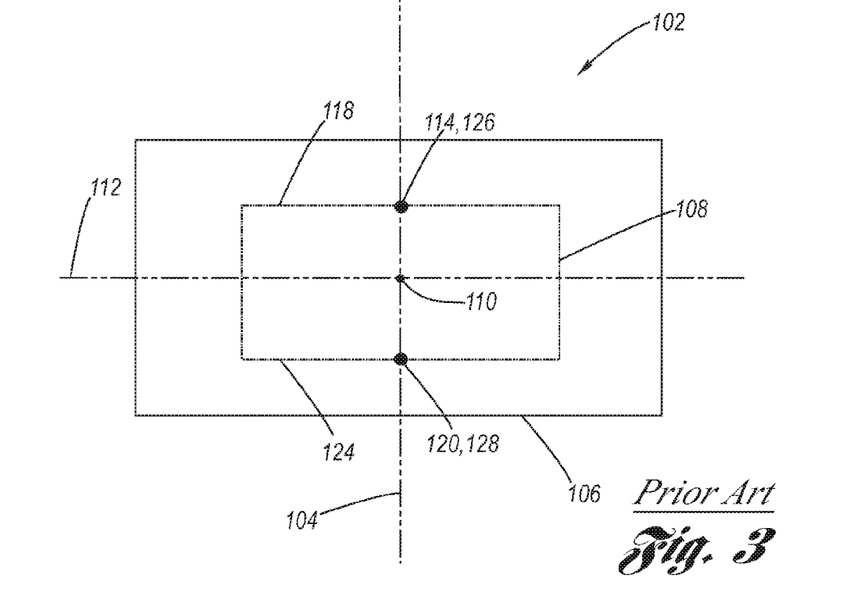
FIG. 3 depicts the first prior art example of wheel assembly balancing viewed along a second axis.
Figure 11:
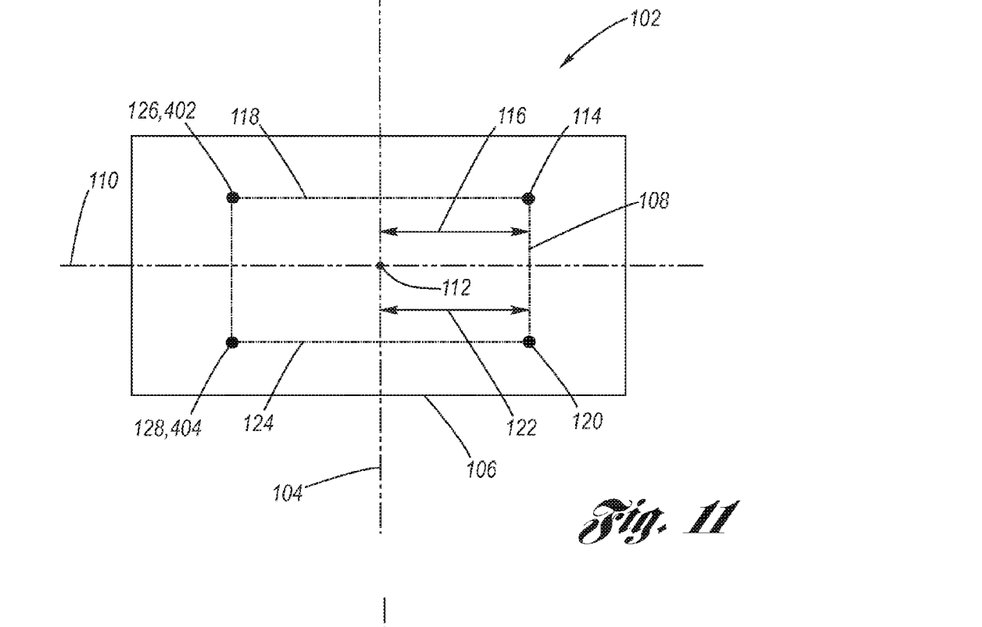
FIG. 11 depicts a first example of the present invention utilizing the first aspect of the present invention viewed along a third axis.

FIG. 11 depicts a first example illustrating the first aspect of the present invention where the wheel assembly 102, viewed along the third axis 112, has a total static imbalance of 2.24 oz, as determined by a spin-balancer consisting of two 1.12 oz weights 114 and 120, previously described and depicted in FIGS. 2 and 3. Utilizing the method of the present invention as implemented at FIG. 10, candidate corrective balance weights are as presented in Table 1. Assuming minimal balance weight increments of ¼ oz, the minimization techniques previously described and implemented at Block 316 of FIG. 10 result in a pair of selected corrective balance weights at Block 318 of FIG. 10 of a first selected corrective balance weight 402 of 1 oz and a second selected corrective balance weight 404 of 1.25 oz. The first and second corrective balance weights 402, 404, respectively, being placed at points 126 and 128, respectively, as shown in FIG. 11.

Figure 12:
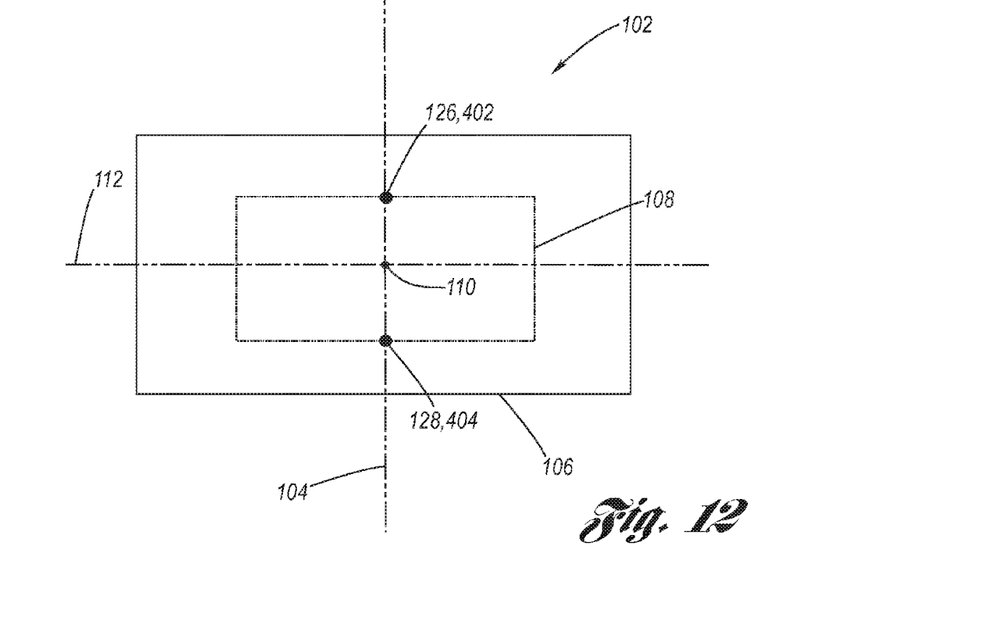
FIG. 12 depicts the first example of the present invention utilizing the first aspect of the present invention viewed along a second axis.

FIG. 12 depicts the first and second selected corrective balance weights 402, 404, respectively, as viewed along a second axis 110. The two selected corrective balance weights 402, 404 of 1 oz and 1.25 oz, respectively, result in a static residual imbalance of 0.0 oz and a couple residual imbalance of 0.125 oz. Compared to the first example of the prior art, previously described and depicted in FIG. 4, in which the static residual imbalance was 0.24 oz and the couple residual imbalance was 0.00 oz, it is seen that the method according to the present invention results in improved dynamic balancing of the wheel assembly 102.

Figure 13:
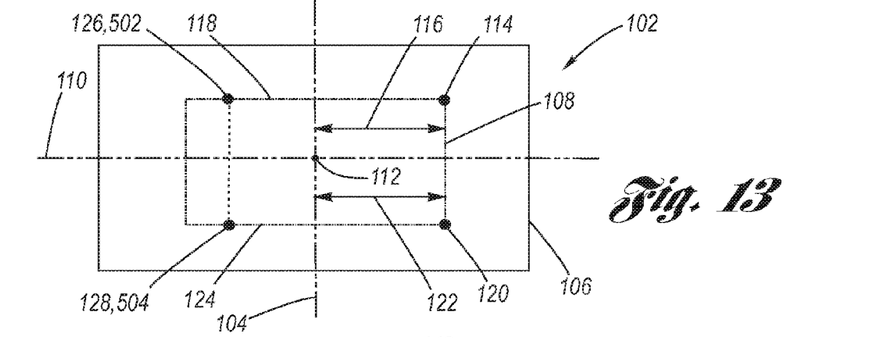
FIG. 13 depicts a second example of the present invention utilizing the first aspect of the present invention viewed along a third axis.

FIG. 13 depicts a second example illustrating the first aspect of the present invention where the wheel assembly 102, viewed along the third axis 112, has a total static imbalance of 3.75+ oz, as determined by a spin-balancer consisting of two 1.875+ oz weights 114' and 120', previously described and depicted in FIGS. 5 through 8. Assuming minimal balance weight increments of ¼ oz, utilizing the method of the present invention implemented at FIG. 10, the three candidate balance weights per predetermined plane and predetermined radii are 2.25 oz, 2.00 oz, and 1.75 oz. Utilizing the minimization techniques previously described and implemented at Block 316 of FIG. 10 results in a pair of selected corrective balance weights at Block 318 of FIG. 10 of 1.75 oz and 2.00 oz placed at points 126 and 128, respectively, as shown in FIG. 13.

Figure 14:
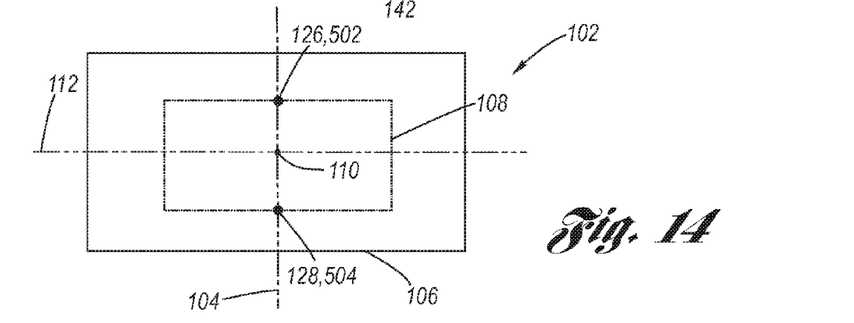
FIG. 14 depicts a second example of the present invention utilizing the first aspect of the present invention viewed along a second axis.

FIG. 14 depicts the selected corrective balance weights 502 and 504 as viewed along the second axis 110. The two selected corrective balance weights 502, 504 of 1.75 oz and 2.00 oz, respectively, result in a static residual imbalance of 0.00 oz and a couple residual imbalance of 0.125 oz. Compared to the second example of the prior art, previously described and depicted in FIGS. 5, 6, 7, 8 and 9, in which the static residual imbalance is 0.22 oz and the couple residual imbalance is 0.25 oz, it is seen that the method according to the present invention results in improved dynamic balancing of the wheel assembly 102.

As demonstrated with the selected examples in the preceding, the improvements attributable to the method of the first aspect of the present invention are related to particular cases of imbalance that can arise in assemblies. To determine the effectiveness of the new method in a population of assemblies, analytical tools are employed, establishing the relative prevalence of conditions amenable to improvement and are described in the following. This permits quantitative estimates of statistical improvement in populations of assemblies. Table 2, thus, is a comparison of mathematical simulations of tires and wheels intended to represent typical combinations of wheels and tires with representative variation in constituent imbalance contributions. The simulations involve creating synthesized distributions of large quantities of tires and wheels with individual imbalance contributions of tires and wheels based on measurements of actual tires and wheels of limited quantities. The simulation practice is frequently referred to as a "Monte Carlo" simulation, as, for example, described in "Quality by Experimental Design", Thomas B. Barker, Utilization of Empirical Equations, Monte Carlo Simulations, pages 331-343, Marcel Dekker, Inc, 1985, ISBN 0-8247-7451-5. The data of Table 2 involves 100,000 tires mated with 100,000 wheels. The resulting distributions of balanced assemblies of tires and wheels are then compared in the tails of the distributions for assessments of efficacy. Since adverse vibratory effects arise from excessive excitation, comparisons of the tails are oftentimes used for these assessments. Typical practice is a comparison of percentiles in the tails of the distributions reflecting relatively low exposure rates. "Incidents Per Thousands of Vehicles" (IPTV) is a convenient selection at levels of imbalance residuals that have historically shown influence on vehicle performance. Table 2 contains the expected numbers of vehicles equipped with at least one assembly in excess of the respective residual levels of imbalance.

TABLE 2

|  | Minimal Incremental Wt. | IPTV of Static Residual in excess of ¼ oz | IPTV of Couple Residual in excess of ¼ oz |
|---|---|---|---|
| Prior Art | ¼ oz | 70.3 | 147.8 |
| Present Invention | ¼ oz | 55.2 | 113.2 |
| Prior Art | ⅛ oz | 60.04 | 44.2 |
| Present Invention | ⅛ oz | 54.8 | 32.8 |

It is seen that the results according to the present invention reduce couple and static balance residuals in the populations more so than does the prior art.

Figure 15:
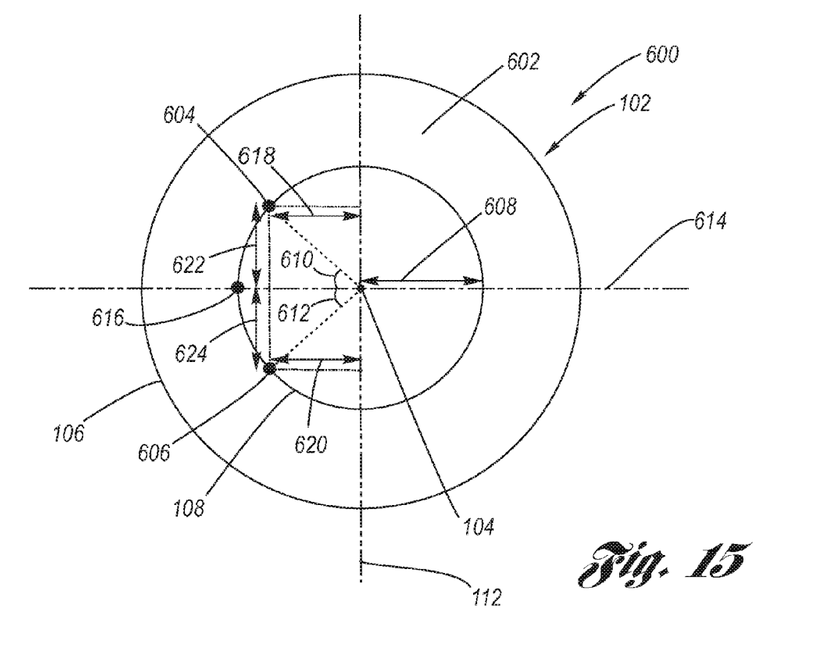
FIG. 15 depicts a third example of the present invention utilizing the second aspect of the present invention.

FIG. 15 depicts an example 600 illustrating a second aspect of the wheel assembly balancing method according to the present invention on a first predetermined plane 602 of wheel assembly 102 utilizing a pair of corrective balance weights $w_1$ 604 and $w_2$ 606, rounded to available corrective balance weights utilizing multiples of the predetermined minimal incremental weight, placed at a predetermined radius 608 and respective corresponding position angles $\theta_1$ 610, and $\theta_2$ 612 with respect to a predetermined line reference 614 according to the second aspect of the present invention. As determined by a dynamic spin-balancer, the required precise corrective balance weight $w_0$ is to be placed at point 616. Candidate corrective balance weights $w_1$ 604 and $w_2$ 606 are selected such that $w_1+w_2 \geq w_0$. Candidate corrective balance weights, $w_1$ 604 and $w_2$ 606 and corresponding position angles $\theta_1$ 610, and $\theta_2$ 612 are determined from simultaneous solution of equations (1-2):

$$w_1*\cos(\theta_1)+w_2*\cos(\theta_2)=w_0 \quad (1)$$

$$w_1*\sin(\theta_1)=w_2*\sin(\theta_2) \quad (2)$$

For identical candidate corrective balance weights $w_1$ 604 and $w_2$ 606, the position angle $\theta$ ($\theta=\theta_1=\theta_2$) is derived from equation (3):

$$2*w_1*\cos(\theta)=w_0 \quad (3)$$

where "*" denotes multiplication.

Projections 618 and 620 represent $w_1*\cos(\theta_1)$ and $w_2*\cos(\theta_2)$, respectively, sum to $w_0$ consistent with equation (1). Projections 622 and 624 represent $w_1*\sin(\theta_1)$ and $w_2*\sin(\theta_2)$, respectively, and, from consideration of the polar plot of inertial contributions, are of opposite polarity resulting in no net force along the direction of the third axis 112. Minimizing the sum of the candidate balance weights while simultaneously enforcing equations 1-2 or equation 3, reduces the propensity to increase errors due to misplacement, however slight, on the wheel. Practical limitations, however, on the selection of corrective weights exist due to physical constraints as explained in the following for the case of identical corrective balance weights, i.e., $w_1=w_2$. If the position angles $\theta_1$ and $\theta_2$ are too small to allow physical placement on wheel assembly 102 of the candidate corrective balance weights $w_1$ 604 and $w_2$ 606 without overlap, weight size must be increased and $\theta$ is recalculated utilizing equation (3) until physical placement of the weights $w_1$ 604 and $w_2$ 606 without overlap is possible. It is preferred that corrective balance weights be as small as possible to minimize errors associated with balance weight uncertainty due to manufacturing variability. However, other considerations such as, for example, a desire to minimize the number of available discrete corrective weight sizes may provide an alternative plurality of available discrete corrective weights to that commonly used with the prior art. The available discrete corrective weight sizes do not need to be separated in small increments in order to achieve perfect theoretical balance, i.e., zero residual static and couple balance. Larger increments and uneven increments are possible, as, for example, smaller increments for the smallest corrective balance weights separated by ⅛ oz, with larger corrective balance weights separated by one of ¼, ½ or 1 oz. Practitioners in the art of balancing will recognize the opportunity with this second aspect of the present invention to precisely balance the assembly with zero static and couple residuals, regardless of proximate available corrective weight sizes. This recognized opportunity follows from the consideration of available corrective balance weight sizes based on the capability for achieving perfect theoretical balance, i.e., zero residual static and couple balance, with only remaining residual contributions from weight tolerancing, inadvertent and uncontrolled slight misplacement of corrective balance weights on the wheel, variations in wheel dimensions, and machine balance measurement errors. Projections 618 and 620 (i.e., equation (1)) combine to sum to the precise balance weight $w_0$ directed along axis 614, while projections 622 and 624 of opposite polarity directed along axis 112 sum to zero. These conditions, when independently existing in both predetermined planes, ensure zero residuals and, in theory, produce zero static and couple residuals according to the second method of the present invention. These practices of equivalent weight conditions within the predetermined planes are obtained by consideration of the inertial effects of the balance masses located at the predetermined radii producing forces at constant spin velocities of the tire and wheel assembly. These inertial effects can be visualized in "polar plots" of resultant inertial forces, proportional to the masses and acting along imaginary lines between the masses and the center of rotation. The practices of treating complex quantities amenable to representation in polar plots is explained in "Mathematical Handbook for Scientists and Engineers", Second Edition, Representation of Complex Numbers as Points or Position Vectors, 1.3-2 and Representation of Addition, Multiplication, and Division, Powers and Roots, 1.3-3, Granino A. Korn, Theresa M. Korn, McGraw-Hill Book Company, 1968, Library of Congress Catalog Card No: 67-16304, and are well known to those skilled in the art of tire and wheel balancing.

Figure 16:
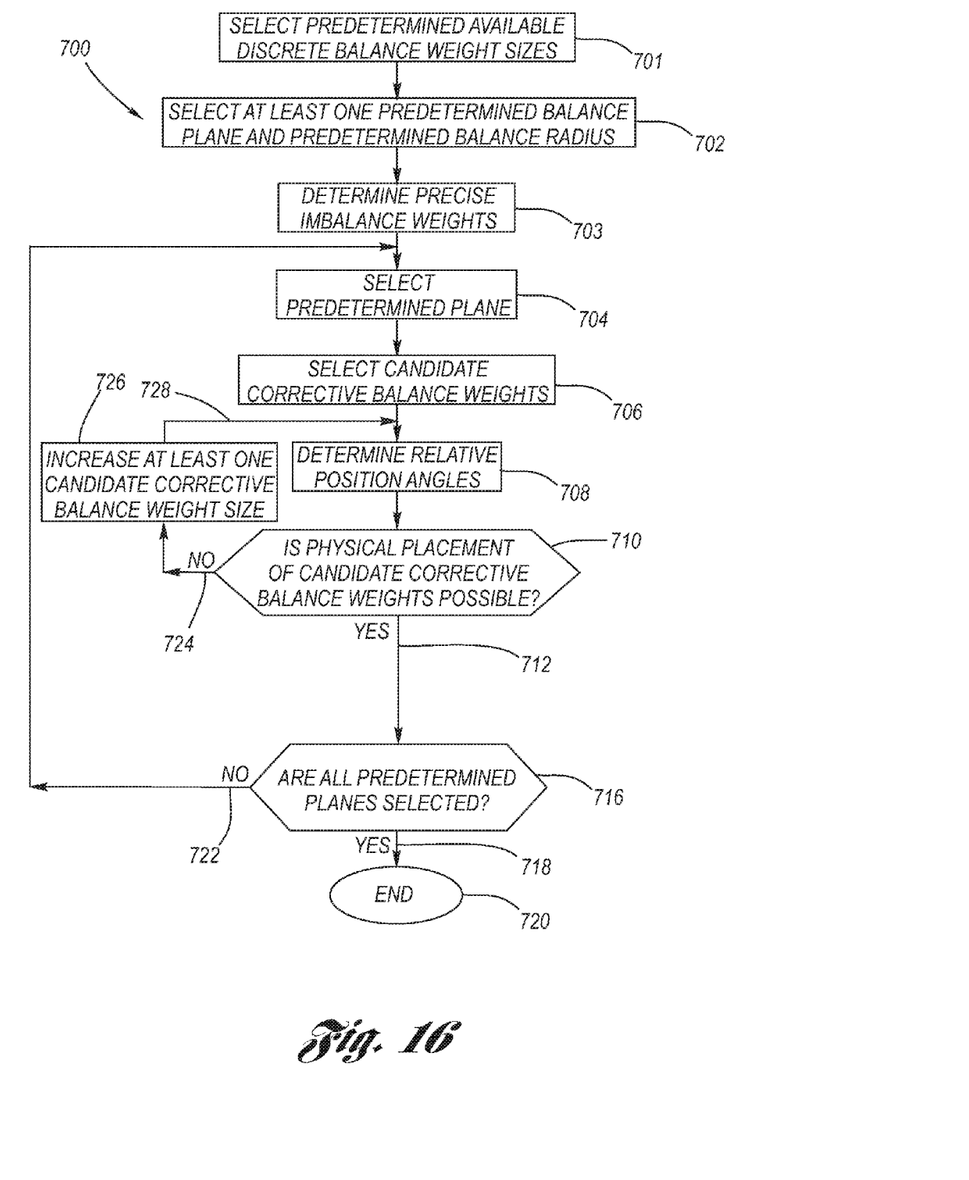
FIG. 16 depicts a flow chart illustrating a method of selecting a pair of balance weights according to the second aspect of the present invention.

FIG. 16 depicts a flow chart 700 illustrating a method of selecting pairs of corrective balance weights for a first and second predetermined plane according to the second aspect of the present invention and exemplified by FIG. 15, wherein flow chart 700 is to be read in association with the following Chart Key 2.

CHART KEY 2

| Block/Line | Description |
|---|---|
| 701 | SELECT PREDETERMINED AVAILABLE DISCRETE BALANCE WEIGHT SIZES |

CHART KEY 2-continued

| Block/Line | Description |
|---|---|
| 702 | SELECT AT LEAST ONE PREDETERMINED BALANCE PLANE AND PREDETERMINED BALANCE RADIUS |
| 703 | DETERMINE PRECISE IMBALANCE WEIGHTS |
| 704 | SELECT PREDETERMINED PLANE |
| 706 | SELECT CANDIDATE CORRECTIVE BALANCE WEIGHTS |
| 708 | DETERMINE RELATIVE POSITION ANGLES |
| 726 | INCREASE AT LEAST ONE CANDIDATE CORRECTIVE BALANCE WEIGHT SIZE |
| 710 | IS PHYSICAL PLACEMENT OF CANDIDATE CORRECTIVE BALANCE WEIGHTS POSSIBLE? |
| 712 | YES |
| 724 | NO |
| 716 | ARE ALL PREDETERMINED PLANES SELECTED? |
| 718 | YES |
| 722 | NO |
| 720 | END |

At Block 701, discrete sizes of available corrective balance weights are determined for eventual physical placement or affixing to the wheels. At Block 702, selected are at least one balance plane and the radius for affixing the corrective balance weights determined by the design of the wheel assembly. No more than two mutually exclusive balance planes are needed for theoretically precise corrective balancing, yielding zero static and couple residuals. For example, a first predetermined plane may be that which is perpendicular to the axis of rotation of the wheel assembly at the outer flange of the wheel and the predetermined radius in the first plane may be that from the axis of rotation of the wheel assembly to the rim of the outer flange of the wheel; whereas a second predetermined plane may be that which is perpendicular to the axis of rotation of the wheel assembly and at the inner flange of the wheel, and the predetermined radius in the second plane may be that from the axis of rotation of the wheel assembly to the rim of the inner flange of the wheel. At Block 703, two initial precision indicated balance weights, $w_0$ and $w'_0$, are determined by a dynamic spin-balancer and respective corresponding line reference determined by the spin-balancer, as previously described, at a predetermined radius at each of two separate predetermined planes to perfectly balance the assembly (static and couple balance residuals=0), so as to completely correct for static and dynamic wheel assembly imbalance as determined by the spin-balancer. At Block 704, one of the two predetermined planes is selected, for example, a first predetermined plane. At Block 706, corrective balance weights $w_{11}$ and $w_{22}$, for example in the case of all available proximate corrective balance weights differing by a constant increment of weight, can be selected such that $w_1+w_2 \geq w_0+\delta$ where $\delta$ is a minimum multiple of the minimal incremental weight (i.e., ¼ oz). In the case of disparate increments between proximate available corrective balance weights, candidate corrective balance weights are selected such that $w_1+w_2 \geq w_0$. It should be recognized that the aforementioned equation for selection of candidate corrective weights in the case of all available proximate corrective balance weights differing by a constant increment of weight, viz., $w_1+w_2 \geq w_0+\delta$ where $\delta$ is a minimum multiple of the minimal incremental weight (i.e., ¼ oz), is a more definitive equation for selection of candidate corrective balance weights than $w_1+w_2 \geq w_0$. This latter equation, viz., $w_1+w_2 \geq w_0$, is also applicable to the case wherein all available proximate corrective balance weights differ by a constant increment of weight. At Block 708, the relative position angles $\theta_1$ and $\theta_2$ are derived from equations (1-2), for dissimilar candidate corrective balance weights, from equation (3) for identical candidate corrective balance weights and are used to position the weights about the precise angular location indicated by the spin balancer as shown in FIG. 15. At Block 710, if physical placement of the candidate corrective balance weights $w_1$ and $w_2$ without overlap is possible, control then passes to Block 716 via line 712. At Block 716, if all predetermined planes are selected, control then passes to Block 720 via line 718. At Block 716, if not all predetermined planes have been selected, control passes back to Block 704 via line 722, wherein for the other, or second, predetermined plane, the required initial precision indicated balance weight is $w'_0$ and the candidate corrective balance weights are $w'_1$ and $w'_2$, where $w'_1+w'_2 \geq w'_0+2\delta$, and the position angles $\theta'_1$, $\theta'_2$ are given, as per equations (1-2) for the case of dissimilar corrective balance weights or equation (3) for the case of identical corrective balance weights.

However, at Block 710, if physical placement of the candidate corrective balance weights $w_1$ and $w_2$ at the first predetermined plane or of the candidate corrective balance weights $w'_1$ and $w'_2$ at the second predetermined plane without overlap is not possible, control passes to Block 726 via line 724. At Block 726, candidate corrective balance weights are increased, and control passes back to Block 708 via line 728. Selections of revised candidate corrective balance weights preferably follow from considerations of minimum total of corrective balance weight within the respective plane, i.e., $w_1+w_2$ and $w'_1+w'_2$ individually, whereby selections are achieved by consideration of next largest available corrective balance weight from proximate available corrective balance weights, individually for one of either $w_1$ and $w_2$ in the first balance plane or $w'_1$ and $w'_2$ in the second balance plane respectively. For the case of identical corrective balance weights within the balance plane, selections are achieved by consideration of next largest available corrective balance weight from proximate available corrective balance weights for both candidate corrective balance weights. For example, if overlap arises in the first balance plane with identical corrective balance weights, both $w_1$ and $w_2$ are increased to the next largest proximate available corrective balance weight. And, if overlap arises in a second balance plane, both $w'_1$ and $w'_2$ are increased to the next largest proximate available corrective balance weight. It is also possible to estimate a combination of increased candidate corrective balance weights from the geometry, typically lengths, of proximate available corrective balance weights and to, thereby, eliminate consideration of certain unusable combinations of proximate candidate corrective balance weights given $w_0$, $w_1$, and $w_2$ and the amount of overlap if overlap occurs in the first balance plane, or given $w'_0$, $w'_1$, and $w'_2$ and the amount of overlap if overlap occurs in a second balance plane. This optional step reduces computational burden within the processor typically used for implementation of the aforementioned considerations and candidate corrective balance weight combinations and can be practiced when computational capacity is limited, affecting throughput at the balancer.

To those skilled in the art to which this invention appertains, it will be recognized that candidate corrective balance weights and combinations thereof, as set forth in the preceding first and second aspects of the present invention will typically be evaluated by computational means at respective evaluation steps, as, for example, to assess overlap, static balance residual, or couple balance residual. These evaluations, however, in certain cases, can be physical or selections can be made from a plurality of candidate corrective balance weight combinations involving operator intervention. For example, with balancers of limited computational capacity, it is conceivable that computational retrofits employing certain steps of the aforementioned first and second aspects of the present invention could be accomplished with combinations of stepwise decision-making by computational means with operator intervention. These hybrid configurations of computational means with operator intervention can be accomplished without departing from the scope of the present invention, limited only by the scope of the appended claims, and can be readily implemented by those skilled in the art of balancing.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A method to balance a wheel assembly having a first balance corrective plane and a second balance corrective plane, comprising the steps of:
   selecting predetermined discrete sizes of balance weights for all available candidate corrective balance weights;
   measuring the wheel assembly for an imbalance; and
   balancing the assembly, comprising the steps of:
      creating a first multiplicity of the candidate corrective balance weights for the first balance corrective plane and a second multiplicity of the candidate corrective balance weights for the second balance corrective plane;
      creating a multiplicity of pair-wise combinations of the candidate corrective balance weights by selecting one candidate corrective balance weight from the first multiplicity and one candidate corrective balance weight from the second multiplicity of the candidate corrective balance weights for multiplicity of all possible pair-wise combinations of selections, said pair-wise combinations including one candidate corrective balance weight each from the first multiplicity of the candidate corrective balance weights and the second multiplicity of the candidate corrective balance weights;
      evaluating the multiplicity of pair-wise combinations of the candidate corrective balance weights for minimization of couple and static forces and couple and static balance residuals;
      selecting a unitary corrective pair-wise combination of corrective balance weights from the multiplicity of pair-wise combinations of the candidate corrective balance weights based on the step of evaluating the multiplicity of pair-wise combinations;
      affixing the selected first corrective balance weight from the first multiplicity of the unitary corrective pair-wise combination of corrective balance weights to the assembly at the first corrective plane; and
      affixing the selected second corrective balance weight from the second multiplicity of the unitary corrective pair-wise combination of corrective balance weights to the assembly at the second corrective plane.

2. The method of claim 1, wherein:
   said first corrective plane is perpendicular to a spin axis of the assembly;
   said second corrective plane is perpendicular to the spin axis of the assembly and axially displaced from that of the first corrective plane; and
   said step of measuring imbalance comprises:
      selecting a first radius within the first corrective plane;
      selecting a second radius within the second corrective plane; and
      determining a first amount of imbalance weight within the first plane at the first radius and a second amount of imbalance weight within the second plane at the second radius.

3. The method of claim 2, wherein said step of selecting predetermined discrete sizes of balance weights for available candidate corrective balance weights comprises selecting possible discrete sizes that are integer multiples of one of ⅛ ounce, ¼ ounce, 2.5 gram and 5.0 gram.

4. The method of claim 2, wherein said step of creating multiplicities of candidate corrective balance weights, comprises:
   creating the first multiplicity of the candidate corrective balance weights comprising a first selected candidate corrective balance weight of the first multiplicity closest in available weight value to the first amount of imbalance weight, a second candidate corrective balance weight one increment greater than the first selected candidate corrective balance weight of the first multiplicity, and a third candidate corrective balance weight of the first multiplicity, one increment less than the first selected candidate corrective balance weight of the first multiplicity, provided the weight value thereof is other than zero; and
   creating the second multiplicity of candidate corrective balance weights comprising a first selected candidate corrective balance weight of the second multiplicity closest in available weight value to the second amount of imbalance weight, a second candidate corrective balance weight of the second multiplicity one increment greater than the first selected candidate corrective balance weight of the second multiplicity, and a third candidate corrective balance weight of the second multiplicity, one increment less than the first selected candidate corrective balance weight of the second multiplicity, provided the weight value thereof is other than zero.

5. The method of claim 4, wherein said step of selecting predetermined discrete sizes of balance weights for available candidate corrective balance weights comprises selecting possible discrete sizes that are integer multiples of one of ⅛ ounce, ¼ ounce, 2.5 gram and 5.0 gram.

6. The method of claim 5, wherein said step of evaluating the multiplicity of pair-wise combinations of candidate corrective balance weights comprises:
   establishing a predetermined limit of couple residual imbalance; and minimizing static imbalance residual within the predetermined limit of couple residual imbalance.

7. The method of claim 4, wherein said step of evaluating the multiplicity of pair-wise combinations of the candidate corrective balance weights comprises:
establishing a predetermined limit of couple residual imbalance; and
minimizing static imbalance residual within the predetermined limit of couple residual imbalance.

8. The method of claim 2, wherein said step of evaluating the multiplicity of pair-wise combinations of the candidate corrective balance weights comprises:
establishing a predetermined limit of couple residual imbalance; and
minimizing static imbalance residual within the predetermined limit of couple residual imbalance.

9. The method of claim 8, wherein said step of selecting a unitary corrective pair-wise combination of balance weights comprises:
establishing a tolerance range of static residual imbalance;
selecting the pair-wise combination of the candidate corrective balance weights from one of the pair-wise combinations of the candidate corrective balance weights yielding minimum static residual imbalance within the tolerance range of static residual imbalance.

10. A method to balance a wheel assembly having at least one predetermined corrective balance plane, comprising the steps of:
selecting predetermined discrete sizes of balance weights for all available candidate discrete corrective balance weights;
measuring the wheel assembly for an imbalance, $w_0$; and
balancing the assembly comprising the steps of:
creating a pair of corrective balance weights comprising a first corrective balance weight $w_1$ at an angular location $\theta_1$ and a second corrective balance weight $w_2$ at an angular location $\theta_2$, wherein $\theta_1$ and $\theta_2$ are measured with respect to a line reference 180 degrees from that of the measured imbalance, $w_0$, and satisfying:

$$w_1*\cos(\theta_1)+w_2*\cos(\theta_2)=w_0;$$

$$w_1*\sin(\theta_1)=w_2*\sin(\theta_2); \text{ and}$$

$$(w_1+w_2)\geq w_0;$$

affixing $w_1$ to the assembly within the at least one corrective balance plane at the angular location $\theta_1$; and
affixing $w_2$ to the assembly within the at least one corrective balance plane at the angular location $\theta_2$.

11. The method of claim 10 wherein an overlap of affixed corrective balance weights, $w_1$ and $w_2$ is avoided and a sum of the corrective balance weights, $w_1+w_2$ is minimized.

12. The method of claim 11 wherein:
the at least one predetermined corrective plane comprises a first corrective plane perpendicular to a spin axis of the assembly; and a second corrective plane perpendicular to the spin axis of the assembly and axially displaced from that of the first corrective plane; and
said step of measuring imbalance comprises:
selecting a first radius within the first corrective plane;
selecting a second radius within the second corrective plane; and
determining a first amount of imbalance weight within the first plane at the first radius and a second amount of imbalance weight within the second plane at the second radius.

13. The method of claim 12, wherein the pair of corrective balance weights in the first corrective plane are identical.

14. The method of claim 13, wherein the pair of corrective balance weights in the second corrective plane are identical.

15. The method of claim 10 wherein:
the predetermined at least one corrective plane comprises a first corrective plane perpendicular to a spin axis of the assembly; and a second corrective plane perpendicular to the spin axis of the assembly and axially displaced from that of the first corrective plane;
a first amount of imbalance weight, $w_o$, within the first corrective plane, a first corrective balance weight, $w_1$, and a second corrective balance weight, $w_2$, within the first corrective plane;
a second amount of imbalance weight, $w_0'$, within the second corrective plane, a first corrective balance weight, $w_1'$, and a second corrective balance weight, $w_2'$, within the second corrective plane; and
said step of measuring imbalance comprises:
selecting a first radius within the first corrective plane;
selecting a second radius within the second corrective plane; and
determining the first amount of imbalance weight within the first corrective plane at the first radius and the second amount of imbalance weight within the second corrective plane at the second radius.

16. The method of claim 15, wherein the pair of corrective balance weights in the first corrective plane are identical.

17. The method of claim 16, wherein the pair of corrective balance weights in the second corrective plane are identical.

18. The method of claim 15, wherein each of the corrective weights of the pair of corrective balance weights are identical.

19. The method of claim 10, wherein each of the corrective weights of the pair of corrective balance weights are identical.

20. The method of claim 10, wherein said step of selecting predetermined discrete sizes of balance weights for available candidate corrective balance weights comprises selecting possible discrete sizes that are integer multiples of one of ⅛ ounce, ¼ ounce, 2.5 gram and 5.0 gram.

* * * * *